(12) United States Patent
Lamadie et al.

(10) Patent No.: US 7,476,863 B2
(45) Date of Patent: Jan. 13, 2009

(54) DEVICE LIMITING THE APPEARANCE OF DECODING ARTEFACTS FOR A GAMMA CAMERA WITH A CODED MASK

(75) Inventors: Fabrice Lamadie, Connaux (FR); Christophe Brenneis, Saint Victor la Coste (FR); Philippe Girones, Venejan (FR); Stéphane Barras, Bouguenais (FR)

(73) Assignee: Commissariat A l'Energie Atomique, Paris (FR)

( * ) Notice: Subject to any disclaimer, the term of this patent is extended or adjusted under 35 U.S.C. 154(b) by 0 days.

(21) Appl. No.: 11/886,439

(22) PCT Filed: Apr. 14, 2006

(86) PCT No.: PCT/FR2006/050350

§ 371 (c)(1), (2), (4) Date: Sep. 13, 2007

(87) PCT Pub. No.: WO2006/111678

PCT Pub. Date: Oct. 26, 2006

(65) Prior Publication Data

US 2008/0128625 A1 Jun. 5, 2008

(30) Foreign Application Priority Data

Apr. 19, 2005 (FR) .................................. 05 50986

(51) Int. Cl.
*G21K 1/02* (2006.01)
(52) U.S. Cl. .............................. 250/363.06; 250/505.1; 250/237 R; 356/310; 378/2
(58) Field of Classification Search ....................... None See application file for complete search history.

(56) References Cited

U.S. PATENT DOCUMENTS

| 5,751,000 A * | 5/1998 | McCroskey et al. ..... 250/363.03 |
| 6,195,412 B1 | 2/2001 | Tobin, Jr. et al. .............. 378/87 |
| 6,737,652 B2 * | 5/2004 | Lanza et al. ........... 250/363.06 |

FOREIGN PATENT DOCUMENTS

WO WO 91/18357 11/1991

OTHER PUBLICATIONS

French Preliminary Search Report, FA 663181 and FR 0550986, 1 pg, (Feb. 9, 2006).
Ivano, O.P. et al., "Portable X-ray And Gamma-ray Imager With Coded Mask: Performance Characteristics And Methods Of Image Reconstruction", Nuclear Instruments & Methods in Physics Research, Section—A: Accelerators, Spectrometers, Detectors And Associated Equipment, Elsevier, Amsterdam, NL, vol. 422, No. 1-3, (Feb. 11, 1999), pp. 729-734, XP004161928, ISSN: 0168-9002.

(Continued)

*Primary Examiner*—David P Porta
*Assistant Examiner*—Yara B Green
(74) *Attorney, Agent, or Firm*—Nixon Peabody LLP

(57) ABSTRACT

The invention relates to a device limiting the appearance of decoding artefacts for a gamma camera with a coded mask comprising a gamma radiation detector (3) opposite the coded mask (1) and having a field of view with an area partially coded (20) by the coded mask (1). It comprises a recessed part (30), which is opaque to the gamma radiation, to be arranged opposite the detector (3) with respect to the coded mask (1), with said recessed part (30) obscuring the partially coded area (20) of the field of view for the detector (3).

11 Claims, 8 Drawing Sheets

OTHER PUBLICATIONS

Gmar, M. et al., "Development Of Coded-Aperture Imaging With A Compact Gamma Camera", IEEE Trans NUCL Sci; IEEE Transactions on Nuclear Science Aug. 2004, vol. 51, No. 41, (Aug. 2004), pp. 1685-1687, XP002366988.

* cited by examiner

DEVICE LIMITING THE APPEARANCE OF DECODING ARTEFACTS FOR A GAMMA CAMERA WITH A CODED MASK

CROSS REFERENCE TO RELATED APPLICATIONS OR PRIORITY CLAIM

This application is a national phase of International Application No. PCT/FR2006/050350 entitled "Device For Limiting Decoding Artefact Appearance For An Encoded Mask Gamma Camera", which was filed on Apr. 14, 2006, which was not published in English, and which claims priority of the French Patent Application No. 05 50986 filed Apr. 19, 2005.

TECHNICAL FIELD

This invention relates to a device limiting the appearance of decoding artefacts inherent to the use of gamma cameras with a coded mask. It is applied in the location of gamma radiation sources.

PRIOR ART

Gamma cameras are apparatuses that make it possible to remotely detect and view gamma radiation sources. They produce images of gamma sources, which are superimposed on visible images of the scene observed, which makes it possible to locate in space and characterise areas of radioactive concentration. These gamma cameras are tools that have been demonstrated in the field, and are particularly suitable for preparing interventions in radiative environments such as maintenance operations, dismantling or inspections.

These gamma cameras can have applications both in the laboratory and in industry.

One of the principles of operation of a gamma camera is well known: a scintillator receives, through collection optics, gamma photons coming from the gamma radiation source. It converts this radiation into a light signal, which is in turn transformed into an electrical signal by a photocathode. The electrical signal thus formed is amplified by an image intensifier and detected by a charge-coupled device (CCD). The scintillator, photocathode, image intensifier and charge coupled device assembly generally forms the detector of the gamma camera. Below, when reference is made to the detector, it will be this assembly and not only the charge-coupled device. The charge-coupled device comprises a certain number of pixels. The detector cooperates with means for processing the detected signals. After processing the signals generated by the detector, it is possible to locate the source by the radiation that it has emitted and which has passed through the collection optics, detector assembly and by the visible-light image of the scene observed. Such gamma cameras are relatively sensitive and high-performing.

The majority of gamma cameras use, as optics for collecting gamma photons, a collimator in the form of two cones opposite the apex or pinpoint hole.

This type of collimator provides a good compromise between the observation field and the resolution. However, due to its shape, it is relatively non-transparent to the gamma radiation, which sometimes leads to a lack of sensitivity. More specifically, it does not make it possible to simultaneously achieve a balance between the low detection limits and the rapid acquisition times.

One of the possible changes for correcting these defects and for increasing the dynamic range of the cameras is based on the use of coded masks in the place of the double-cone collimators. These are collimators comprising a plurality of transparent elements and a plurality of opaque elements, which make it possible to significantly increase the surface of the scintillator exposed directly to the gamma radiation. The signal received by the detector is modulated by the coded mask. These transparent and opaque elements must follow a specific arrangement. These collimators do not produce a direct image of the scene observed, but rather a "coded" image of the scene observed, which must then be mathematically processed so as to reconstruct a realistic image.

A gamma camera with a coded mask is described in the article "Development of Coded-Aperture Imaging with a Compact Gamma Camera" M. Gmar, O. Gal, C. Le Goaller, O. P. Ivanov, V. N. Potapov, V. E. Stepanov, F. Laine, F. Lamadie, IEEE Transactions on Nuclear Science, August 2004, volume 51, pages 1682 to 1687.

The masks used can be of the URA (Uniformly Redundant Array) masks, which take advantage of the tables of quadratic residues in which the two dimensions are two prime numbers that differ by two. Their derivatives, such as the HURA (Hexagonal URA) or the MURA (Modified URA) are also beneficial. The theory of URA coded masks was defined by E. E. Fenimore and T. M. Cannon in 1972. These masks can be used, as in FIG. 1A, in an extended mask configuration with a detector smaller than the mask. The mask is cyclic and comprises a basic pattern that is repeated a number of times, possibly partially. In the second possible configuration shown in FIG. 1B, the mask is smaller than the detector. This configuration is not advantageous because it requires the use of large bulky detectors, which is incompatible with compact gamma imaging. In these figures, reference 1 denotes the coded mask, reference 2 denotes the scintillator and reference 3 denotes the detector.

This coding technique has a defect that can cause location problems in certain configurations for coded masks with repetitive patterns. Indeed, there are two distinct areas in the field of view of the camera or of the detector, a total coding area referenced 10 in FIGS. 2A, 2B and a partial coding area referenced 20 in FIGS. 2A, 2B. These areas will hereinafter be referred to as a totally coded area and a partially coded area.

FIGS. 2A and 2B partially show a camera equipped with a coded mask 1. The detector 3 is placed opposite the coded mask 1.

The totally coded area 10 corresponds to a volume delimited by surfaces that come into contact with the edges opposite the detector 3 and the coded mask 1. These surfaces form an envelope 10.1 for the totally coded area.

The partially coded area 20 corresponds to a volume contained between the volume delimited by surfaces that come into contact with the edges opposite the detector 3 and the coded mask 1 and the envelope 10.1 of the totally coded area 10.

For a gamma radiation source 11 located in the totally coded area 10 of the field of view of the detector 3, each pixel of the detector 3 receives a signal that has passed through the coded mask 1. This signal can be decoded in only one way; it leads to a realistic reconstitution of the scene. This configuration is shown in FIG. 2A.

On the contrary, as shown in FIG. 2B, for a gamma radiation source 21 located in the partially coded area 20 of the field of view of the detector 3, the modulation by the coded mask 1 is incomplete. For the same signal, a number of reconstitutions are possible and decoding artefacts 22 appear in the decoding. These artefacts 22 are, in principle, undifferentiable from real sources. They make it difficult to use the coded mask technique since they cause false gamma radiation sources to appear.

At present, there is not suitable solution, even mathematical, for properly reducing these decoding artefacts.

DESCRIPTION OF THE INVENTION

This invention in fact is intended to propose a device limiting the appearance of decoding artefacts for a gamma camera with a coded mask that is simple to produce and that does not require the use of complex mathematical processing operations in order to remove the decoding artefacts. This device makes it possible to limit the detrimental influence of radiation sources that are located in the partially coded area of the gamma camera and that are at the source of these decoding artefacts.

More specifically, this invention is a device limiting the appearance of decoding artefacts for a gamma camera with a coded mask comprising a gamma radiation detector opposite the coded mask and having a field of view with an area partially coded by the coded mask. According to the invention, the device comprises a recessed part, which is opaque to the gamma radiation, to be arranged opposite the detector with respect to the coded mask, which obscures the partially coded area of the field of view for the detector.

The recessed part borders the coded mask.

The recessed part can have a substantially cylindrical, frusto-conical, pyramid-shaped, or even polyhedral internal wall.

The recessed part can be made of metal with a density greater than 7 g/cm$^3$.

More specifically, the recessed part can be made of stainless steel, lead or a lead-based alloy, copper or a copper-based alloy, tungsten or a tungsten-based alloy such as that known under the name DENAL, which is a trademark of the CIME BOCUZE company.

The recessed part can have a substantially constant thickness over its entire length.

Alternatively, the recessed part can have a thickness that varies over its length, so that a gamma photon is stopped by the same thickness of material, regardless of its path between the partially coded area of the field of view and the detector.

The recessed part can be equipped with a screw thread so as to be screwed on a support part of the coded mask.

The gamma camera comprises a field of view with an area totally coded by the coded mask, limited by an envelope and adjacent to the partially coded area; the recessed part can comprise a free end opposite the detector when it is mounted on the camera so that the envelope of the totally coded area passes through the free end.

The recessed part can have an internal wall that engages with the casing of the totally coded area.

The recessed part can have an end opposite the coded mask that is substantially rounded.

The rounded end can correspond to a radius centred in a central portion of the detector.

This invention also relates to a gamma camera that comprises such a device limiting the appearance of decoding artefacts.

BRIEF DESCRIPTION OF THE DRAWINGS

This invention can be better understood on reading the description of example embodiments provided purely for indicative and non-limiting purposes, in reference to the appended drawings, in which.

Identical, similar or equivalent parts of the various figures described below have the same numeric references for the sake of consistency between figures.

The various parts shown in the figures are not necessarily shown according to a uniform scale, so as to make the figures easier to read.

DETAILED DESCRIPTION OF SPECIFIC EMBODIMENTS

Figure 1A:
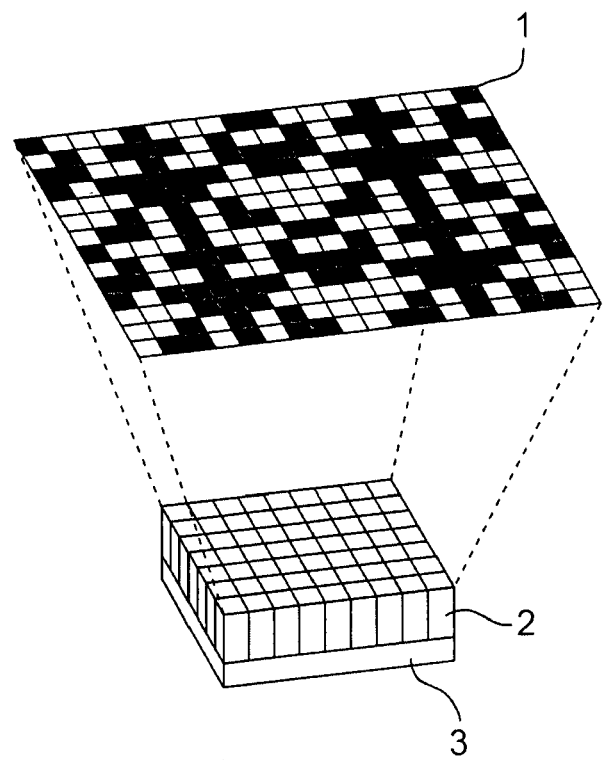
FIGS. 1A and 1B diagrammatically show two examples of a gamma camera with a coded mask.
Figure 1B:
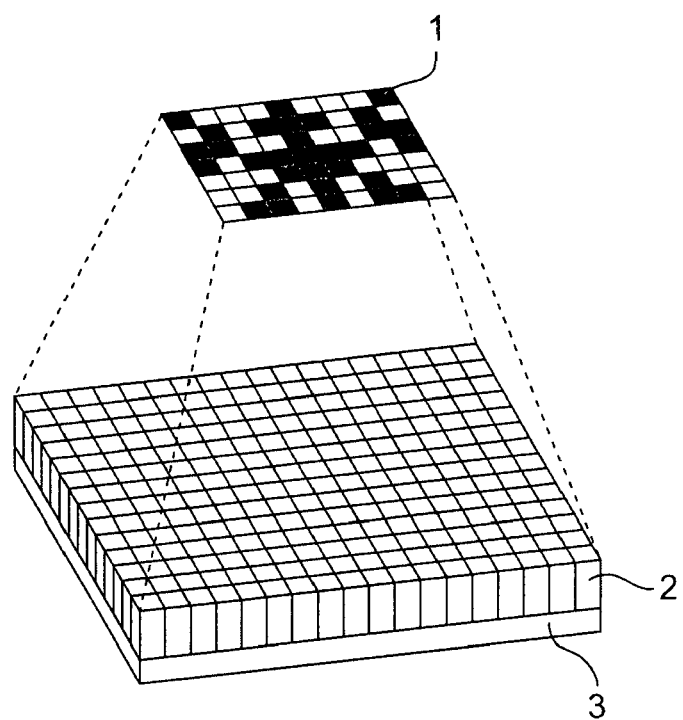
Figure 2A:
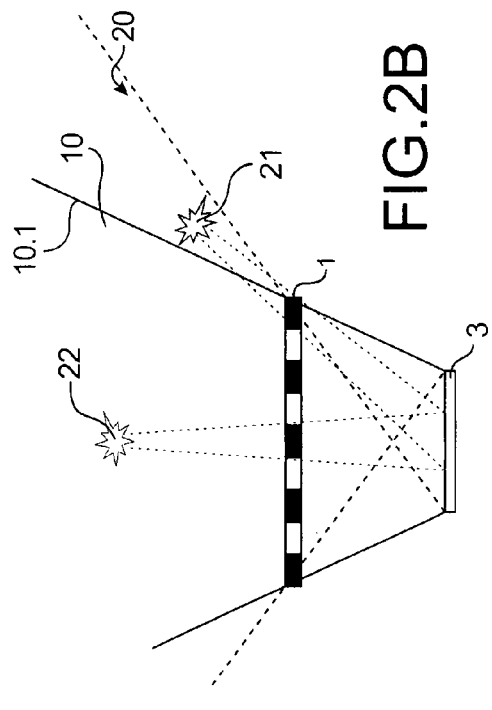
FIGS. 2A and 2B diagrammatically show a gamma camera and show the area totally coded and the area partially coded by the coded mask and the appearance of decoding artefacts according to the position of the gamma source to be observed.
Figure 2B:
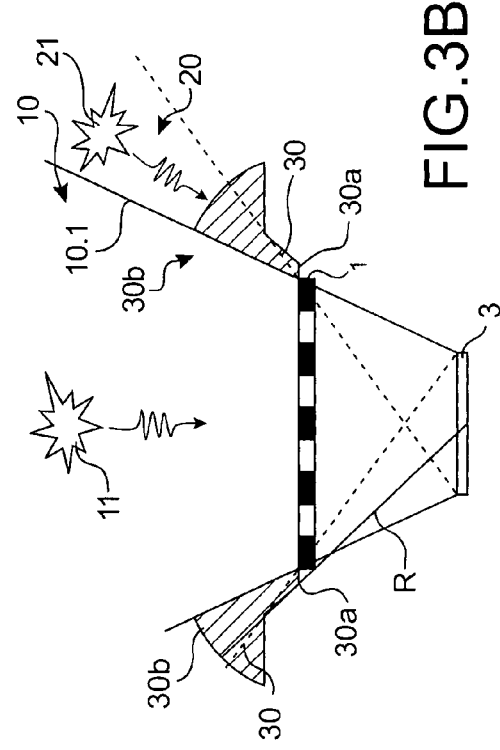
Figure 3A:
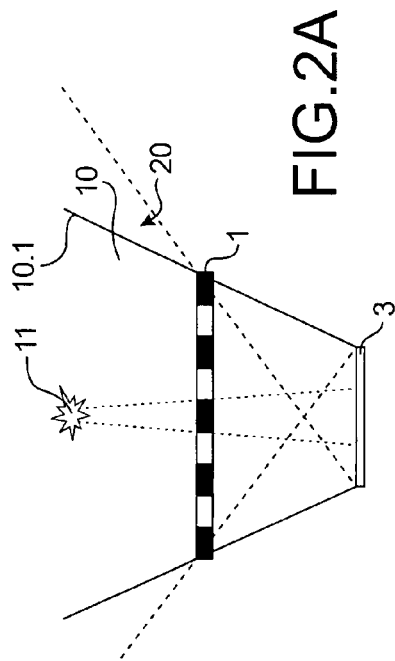
FIGS. 3A and 3B show two embodiments of a device limiting the appearance of decoding artefacts for a gamma camera with a coded mask according to the invention.
Figure 3B:
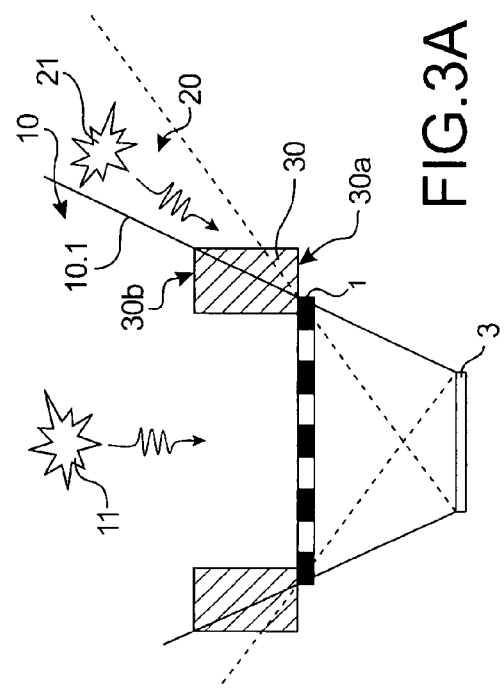

We will now discuss FIGS. 3A and 3B, which diagrammatically and partially show devices limiting the appearance of decoding artefacts for gamma cameras with a coded mask.

The gamma camera is shown diagrammatically with a detector 3 arranged opposite the coded mask 1. We have also shown the totally coded area 10 (with solid lines) and the partially coded area 20 (with dotted lines). A first radiation source 11 has been shown in the totally coded area 10. Owing to its position with respect to the assembly formed by the detector 3 and the coded mask 1, the source 11 can be detected with precision. A second radiation source 21 is placed in the partially coded area 20.

The gamma camera is equipped with a device limiting the appearance of decoding artefacts 30, which will obscure the second source 21 for the detector 3 without having any effect on the radiation coming from the first source 11. More specifically, this device limiting the appearance of decoding artefacts 30 obscures the entire partially coded area 20 for the detector 3. It cooperates with the coded mask 1 and is arranged opposite the detector 3 with respect to the coded mask 1. This device limiting the appearance of decoding artefacts 30 is opaque to the radiation emitted by the gamma sources.

It can have the shape of a recessed part 30 that borders the coded mask 1. In FIG. 3A, this recessed part is tubular, and more specifically is a cylindrical rotational tube, but other shapes are possible in order to optimise the technical effect. Its internal wall can in particular be frusto-conical, as shown in FIG. 3B, or even pyramid-shaped or polyhedral. These shapes are not explicitly shown for the sake of simplifying the figures, but FIG. 3A could very well show a polyhedral shape and FIG. 3B a pyramid shape.

This recessed part 30 has an end 30a that is integrated with the coded mask 3 and a free end 30b. In the example shown in FIG. 3A, the envelope of the totally coded area 10 passes through the free end 30b of the recessed part 30. This constraint helps to determine the external length and width of the recessed part 30. The thickness of the material of the recessed part is substantially constant over its entire length.

In the example of FIG. 3B, the internal wall of the recessed part 30 engages the envelope 10 of the totally coded area. The thickness of the material of the recessed part is not constant over its entire length. This thickness is such that a gamma photon is stopped by the same thickness of material, regardless of its path between the partially coded area 20 of the field of view and the detector 3.

In the configuration of FIG. 3B, the recessed part 30 has a free end 30b opposite the coded mask 1, which is substantially rounded. The rounded end has a radius R centred in a central portion of the detector 3.

This recessed part 30 is made of a metal material having a relatively high density of at least 7 g/cm$^3$. It can be stainless steel, with a density of around 7.86 g/cm$^3$, or lead or a lead-based alloy, or copper or a copper-based alloy. Advantageously, it can be tungsten (density of 18.3 g/cm$^3$) or a tungsten-based alloy such as that known under the name DENAL. The density of this tungsten- and copper-based alloy is around 18.5 g/cm$^3$, which makes it very effective for attenuating the gamma photons. The DENAL will preferably be used in the presence of high-energy gamma photons, with an energy greater than for example 100 keV, and the copper or the other materials cited above for lower energies. Another beneficial property of the DENAL is its good machinability with conventional tools, which make it preferable to lead, which is highly ductile.

Figure 4A:
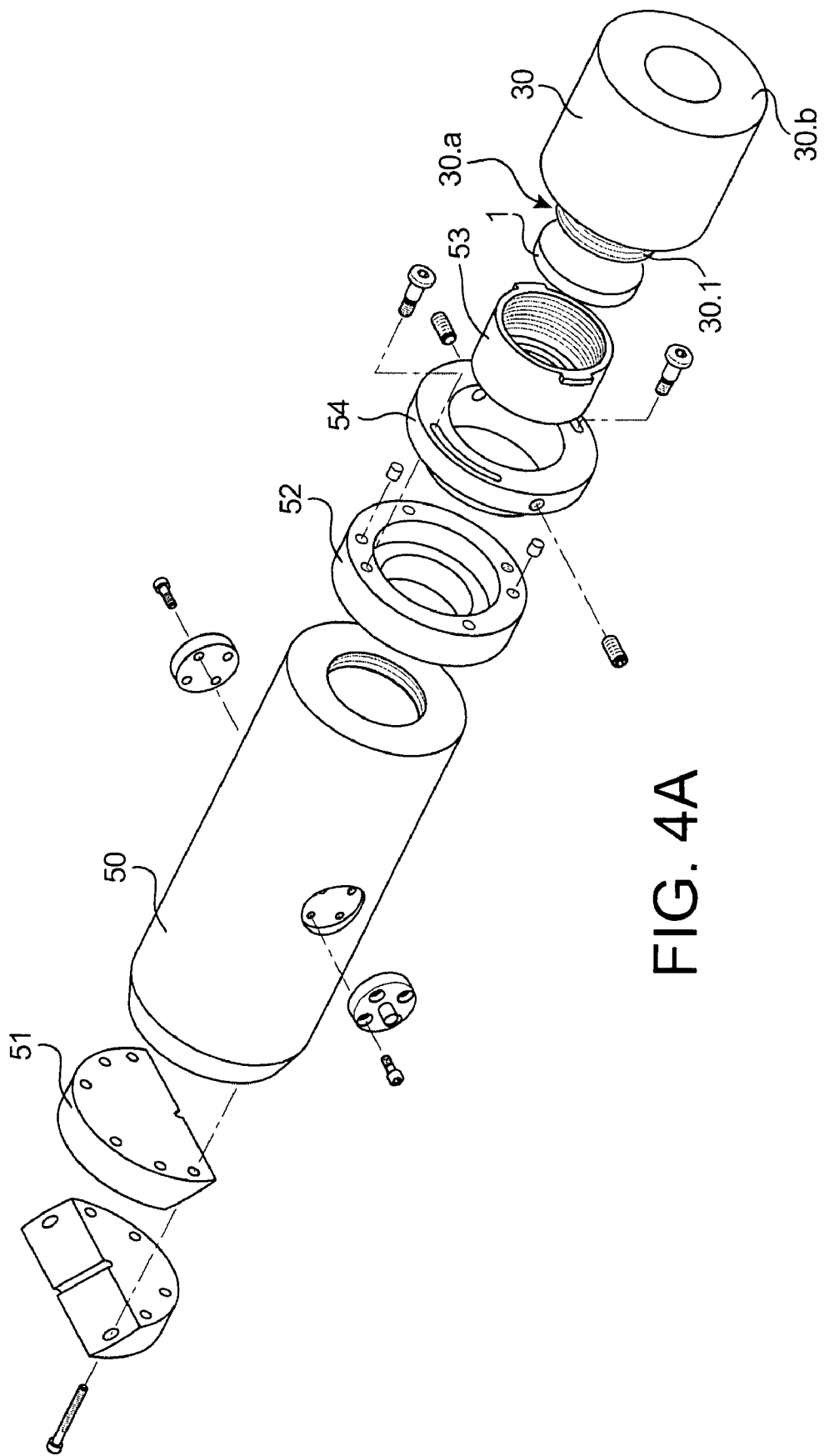
FIGS. 4A and 4B show, in an exploded view and in a cross-section view, a gamma camera equipped with a device according to the invention.
Figure 4B:
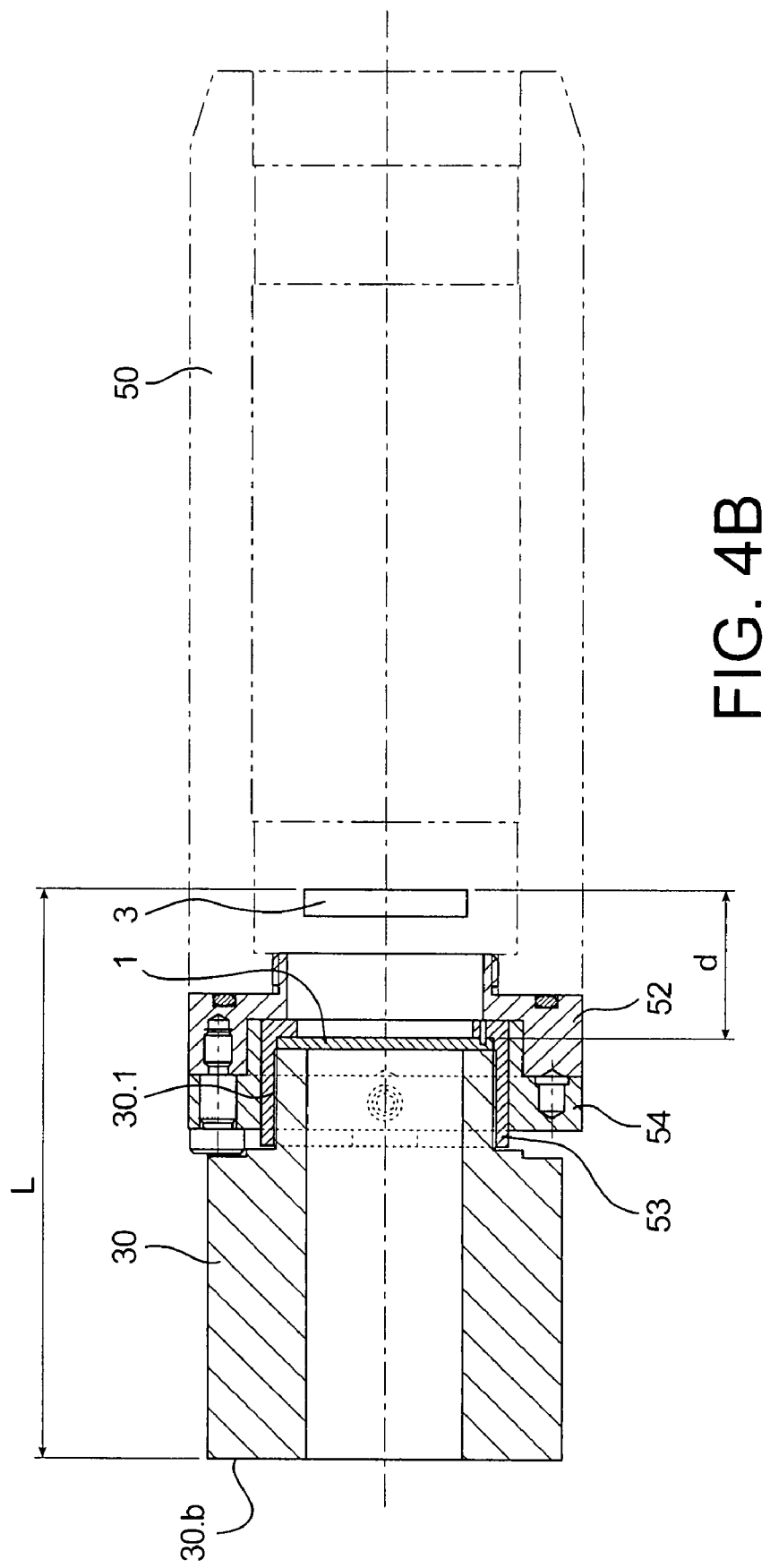

FIGS. 4A and 4B show, in an exploded view and in a partial cross-section view, an example of a gamma camera according to the invention in the configuration of FIG. 3A.

Figure 5A:
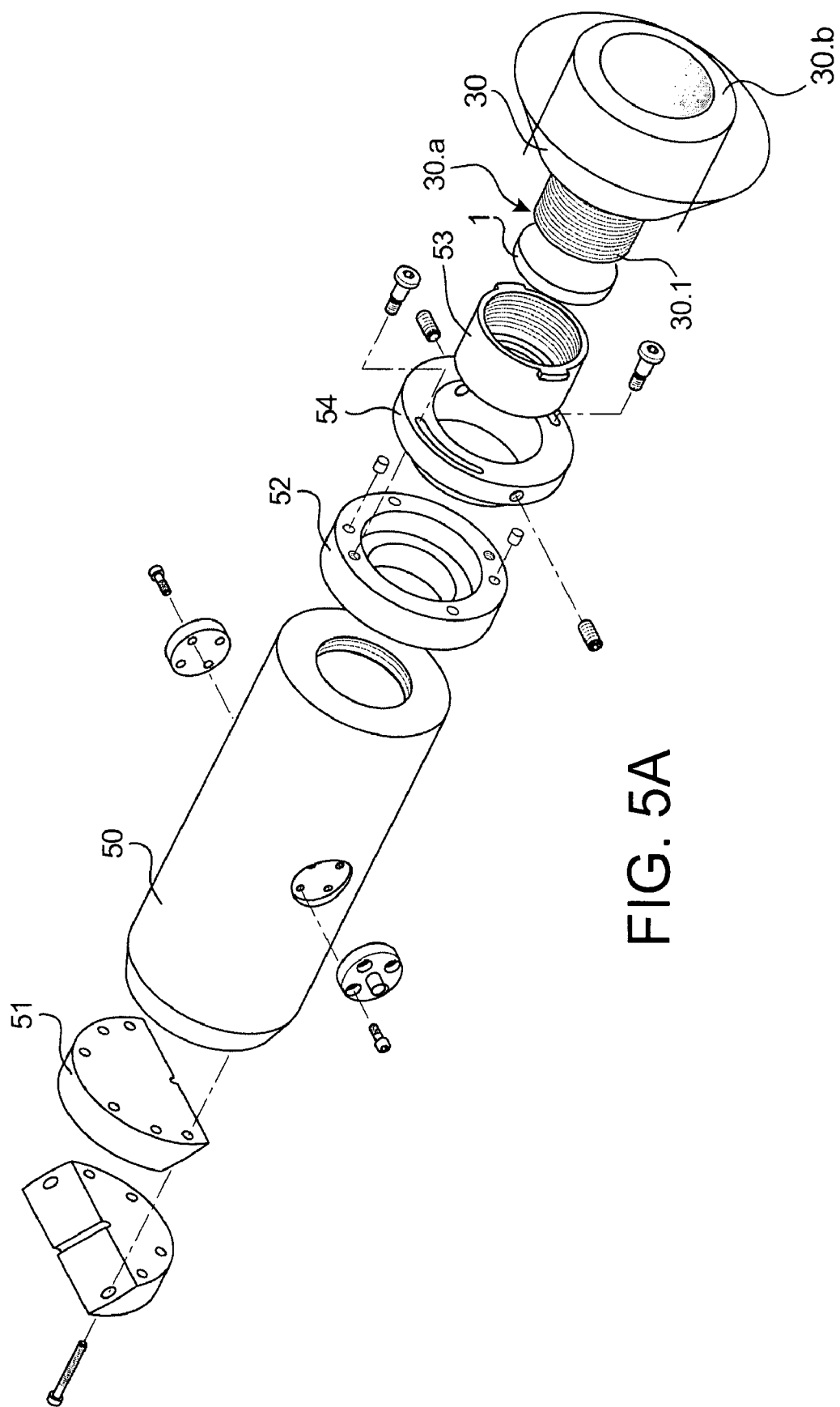
FIGS. 5A and 5B show, in an exploded view and in a cross-section view, a gamma camera equipped with another example of the device according to the invention.
Figure 5B:
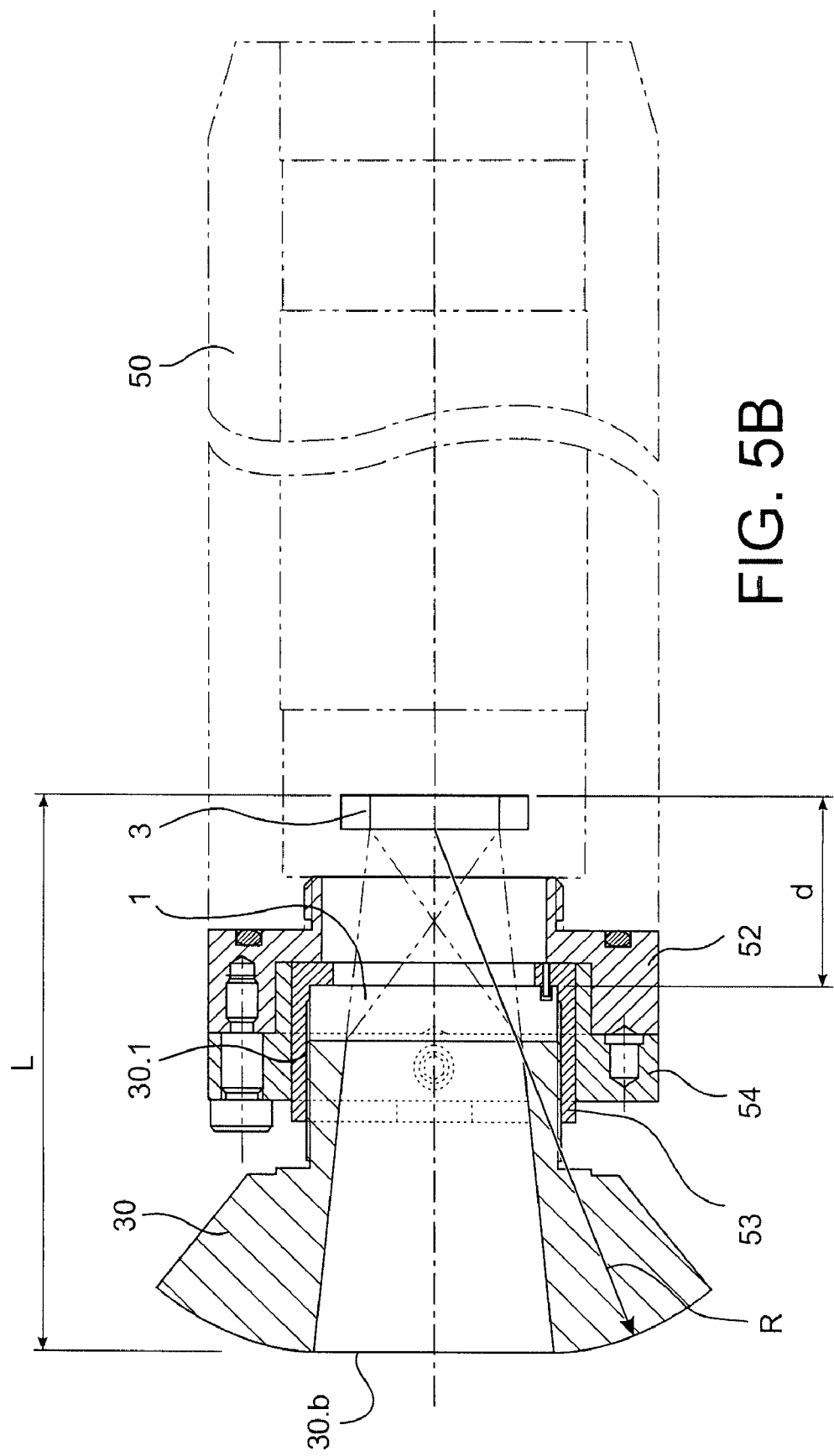

FIGS. 5A and 5B show, in an exploded view and in a partial cross-section view, an example of a gamma camera according to the invention in the configuration of FIG. 3B.

Figure 6A:
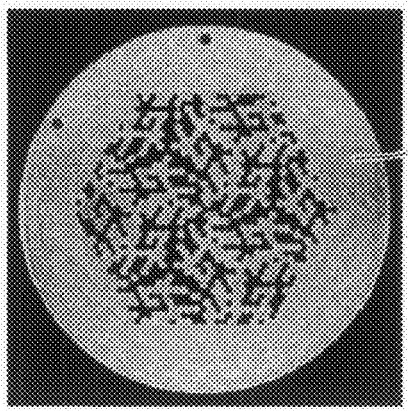
FIGS. 6A to 6C show the fronts of three examples of coded masks used in the gamma camera of FIGS. 4A, 4B, 5A and 5B.
Figure 6B:
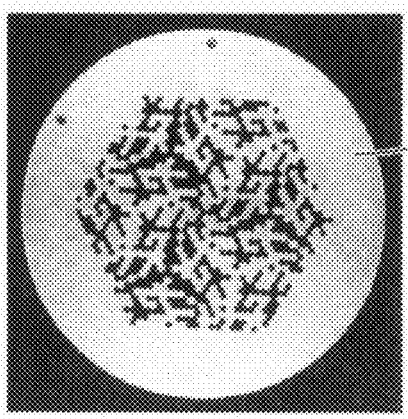
Figure 6C:
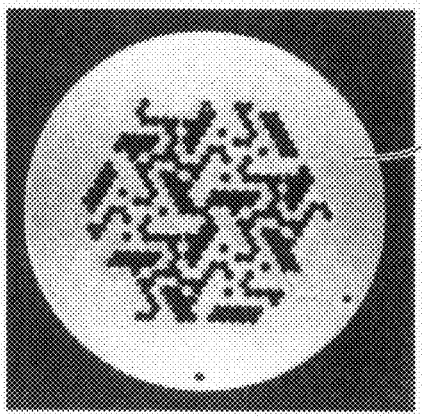

Reference 50 shows a body of the gamma camera. It is in this generally rotational cylinder-shaped body 50 that the detector 3 is housed, which is visible only in FIGS. 4B and 5B. In FIGS. 4A and 5A, one of the ends of the body 50 is closed by a base 51 with a passage for power lines (not shown). The coded mask 1 is integrated with the other end of the body 50 by means of a plurality of rings 52, 53, 54 that fit together. Two external rings 52, 54 partially fitting one inside the other and an internal ring referenced 53 can be distinguished. In fact, the coded mask 1 associated with the device limiting the appearance of decoding artefacts 30 forms a removable member that can be changed as needed. Tests conducted to evaluate the device limiting the appearance of decoding artefacts 30 have used three coded masks 1 with different patterns and thicknesses. They are shown in FIGS. 6A to 6C.

One of the external rings 52 makes it possible to attach the coded mask 1 to the body 50 of the camera. The coded mask 1 is embedded in the internal ring 53, which is housed in the two external rings when they are assembled one inside the other. One or more fingers can be provided to securely attach the coded mask 1 to the internal ring 54. The device limiting the appearance of decoding artefacts is then attached inside the internal ring 53. The other external ring 54 is capable of moving in rotation with respect to the first external ring 52, and thus causing the rotation of the internal ring 53, with the coded mask 1 and the device limiting the appearance of decoding artefacts 30. In this way, the coded mask 1 can adopt a plurality of given positions, for example two offset by 60°, which makes it possible to produce, with the same coded mask, two antisymmetrical coded images of the same scene, which in the processing operation will allow the signal-to-noise ratio to be improved.

The device limiting the appearance of decoding artefacts 30 is produced by a recessed rotational cylinder part or a recessed cone frustum part having a threaded end 30.1, which is screwed inside the internal ring 53 and a free end on the side of the scene to be viewed.

Prototypes of such a recessed part have been tested. These are rotational cylinders with a length of 70 mm or 125 mm, an inner radius of less than 48.1 mm and a larger external radius of 108.1 mm. They are made of stainless steel. It is the short (70 mm) device 30 limiting the appearance of decoding artefacts that is shown in FIGS. 4A and 4B.

The detector 3 has a diameter of 50 mm. The distance d separating the rear face of the coded mask and the rear face of the detector 3 is 45.4 mm. The rear faces of the coded mask 1 and the detector 1 are located on the side of the base of the camera body, with their front face being on the side of the scene to be viewed.

A plurality of coded masks 1 have been tested. HURA-type coded masks are shown in FIGS. 6A to 6C. The mask of FIG. 6A has rank 9 and a thickness of 4 mm, while that of FIG. 6B, also with rank 9, has a thickness of 6 mm. The mask of FIG. 6C is that of rank 6. It is noted that the rank of a coded mask is the number that uniquely defines the basic pattern of the mask and the dimension of the elements (holes and solids), which can be hexagons. For example, a mask of rank R will have K elements in its basic central pattern with K=3R(R+1)+1. The total pattern of the masks is a flat 45-mm hexagon. The characteristics of these coded masks are presented in the following table:

| MASKS | RANK 6 | RANK 9 |
| --- | --- | --- |
| Thickness | 12 mm | 4 and 6 mm |
| Distance between holes | 1.85 mm | 1.26 mm |
| Number of holes in the central pattern | 64 | 136 |
| Lighted surface | 1.9 cm | 1.9 cm |

The distance L separating the rear face of the detector 3 from the free end of the decoding artefact attenuating means is 174.4 mm for the coded mask with a thickness of 4 mm, 176.4 mm for the coded mask with a thickness of 6 mm, and 182.4 mm for the coded mask with a thickness of 12 mm.

Figure 7A:
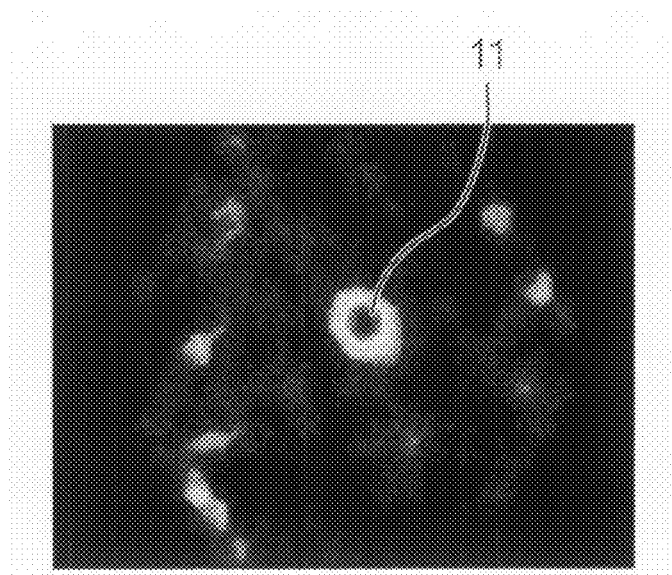
FIGS. 7A and 7B respectively show an image of a radiation source parasitized by a source three times more intense, taken with a gamma camera according to the invention and according to the prior art.
Figure 7B:
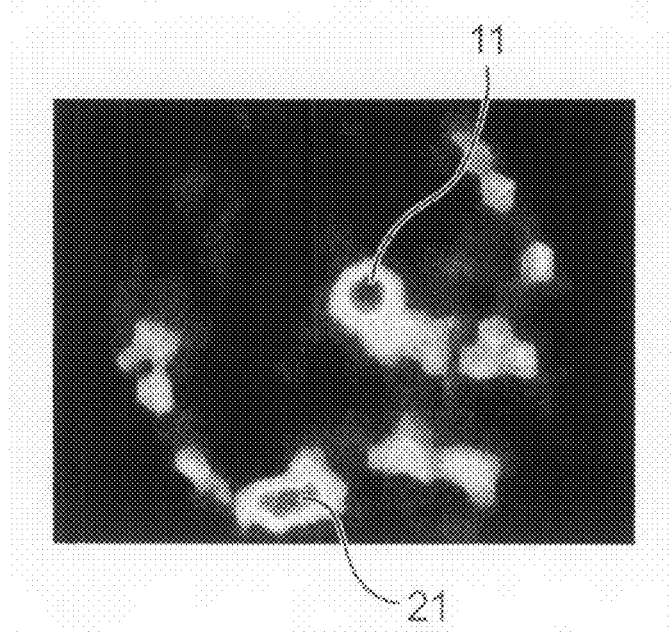

It is possible to observe, with these prototypes of devices limiting the appearance of decoding artefacts, sources placed in the total coding area, in the presence of parasitic sources located in the partial coding area, more intense than the first. Reference can be made to FIGS. 7A and 7B, which show a view of a scene showing a cobalt source 60 parasitized by a caesium source 137. In this configuration, the dose rate generated by the caesium source 137 at the level of the gamma camera is three times more intense than that generated by the cobalt source 60. The view of FIG. 7A was taken with a gamma camera equipped with a device limiting the appearance of decoding artefacts of the invention and the view of FIG. 7B was taken with a gamma camera with a coded mask without the device of the invention. In FIG. 7A, the parasitic source is not visible, while in FIG. 7B, it is visible and gives a false representation of the scene observed.

Although a plurality of embodiments of the invention have been shown and described in detail, it should be understood that various changes and modifications can be made without going beyond the scope of the invention. This invention is not limited to the coded masks described. On the contrary, it encompasses all types of coded masks capable of producing decoding artefacts. Similarly, the decoding artefact attenuating means are not limited to those described. Other materials, in particular, as well as other shapes, can be used.

The invention claimed is:

1. Device limiting the appearance of decoding artefacts for a gamma camera with a coded mask (1) comprising a gamma radiation detector (3) opposite the coded mask and having a field of view with an area partially coded (20) by the coded mask, characterised in that it comprises a recessed part (30), which is opaque to the gamma radiation, to be arranged opposite the detector (3) with respect to the coded mask (1), with said recessed part (30) obscuring the partially coded area (20) of the field of view for the detector (3) and having a thickness that varies over its length, so that a gamma photon is stopped by the same thickness of material, regardless of its path between the partially coded area (20) of the field of view and the detector (3).

2. Device according to claim 1, characterised in that the recessed part (30) has a substantially cylindrical, frusto-conical, pyramid-shaped, or even polyhedral internal wall.

3. Device according to claim 2, characterised in that the recessed part (30) borders the coded mask (3).

4. Device according to claim 1 characterised in that the recessed part (30) is made of metal with a density greater than 7 g/cm$^3$.

5. Device according to claim 4, characterised in that the recessed part (30) can be made of stainless steel, lead or a lead-based alloy, tungsten or a tungsten-based alloy such as DENAL, or copper or a copper-based alloy.

6. Device according to claim 1, characterised in that the recessed part (30) has a threaded end (30a) so as to be attached by screwing to a support part (53) of the coded mask (1).

7. Device according to claim 1, for a gamma camera with a coded mask with a field of view having an area totally coded (10) by the coded mask (1), limited by a casing (10.1) and adjacent to the partially coded area (20), characterised in that the recessed part (30) comprises a free end (30b) opposite the detector (3) when it is mounted on the camera so that the casing (10.1) of the totally coded area (10) passes through the free end (30b).

8. Device according to claim 1, for a gamma camera with a coded mask with a field of view having an area totally coded (10) by the coded mask (1), limited by a casing (10.1) and adjacent to the partially coded area (20), characterised in that the recessed part (30) has a wall that engages with the casing (10.1) of the totally coded area (10).

9. Device according to claim 1, characterised in that the recessed part (30) has a free end (30b) opposite the detector (3) when it is mounted on the camera, which free end (30b) is substantially rounded.

10. Device according to claim 9, characterised in that the rounded end corresponds to a radius (R) centred in a central portion of the detector (30).

11. Gamma camera characterised in that it comprises a device (30) limiting the appearance of decoding artefacts according to claim 1.

* * * * *